US005174698A

United States Patent [19]

Obermeier

[11] Patent Number: 5,174,698

[45] Date of Patent: Dec. 29, 1992

[54] TOOL BIT AND TOOL BIT HOLDER FOR HAND HELD TOOLS

[75] Inventor: Josef Obermeier, Peiting, Fed. Rep. of Germany

[73] Assignee: Hilti Aktiengesellschaft, Furstentum, Liechtenstein

[21] Appl. No.: 839,201

[22] Filed: Feb. 20, 1992

[30] Foreign Application Priority Data

Feb. 21, 1991 [DE] Fed. Rep. of Germany ....... 4105414

[51] Int. Cl.[5] .............................................. B23B 31/02

[52] U.S. Cl. .................................. 408/240; 279/19.3; 279/19.5; 408/226

[58] Field of Search .................. 408/226, 239 R, 240; 279/81, 82, 75, 19, 19.3, 19.4, 19.5; 173/48, 104

[56] References Cited

U.S. PATENT DOCUMENTS

| | | | |
|---|---|---|---|
| 4,107,949 | 8/1978 | Wanner et al. | 279/75 X |
| 4,123,074 | 10/1978 | Wanner | 279/19.5 |
| 4,131,165 | 12/1978 | Wanner et al. | 279/19.3 X |
| 4,502,824 | 3/1985 | Dohse et al. | 173/48 |
| 4,691,929 | 9/1987 | Neumaier et al. | 279/81 X |
| 4,717,292 | 1/1988 | Phillips | 279/75 X |
| 4,840,519 | 6/1989 | Kleine | 408/226 |
| 4,943,192 | 7/1990 | Lafforgue et al. | 279/19 X |
| 5,028,057 | 7/1991 | Wanner | 408/226 X |
| 5,076,371 | 12/1991 | Obermeier et al. | 408/226 X |

FOREIGN PATENT DOCUMENTS

| | | | |
|---|---|---|---|
| 293327 | 11/1988 | European Pat. Off. | 279/19 |

*Primary Examiner*—Daniel W. Howell
*Attorney, Agent, or Firm*—Anderson Kill Olick & Oshinsky

[57] ABSTRACT

In a combination tool bit and tool bit holder or chuck, rotary entrainment members (6, 7) extending over different circular arcs are formed in the tool bit holder for transmitting torque to the tool bit shank (8). Corresponding rotary entrainment grooves (9, 10), also extending over different circular arcs, are formed in the tool bit shank (8). Locking members (4) axially retain the tool bit in the holder. The locking members (4) can be displaced radially into or out of the recesses (11, 12) in the tool bit shank (8). The recesses (11, 12) are laterally closed. Due to the different configurations of the rotary entrainment members (6, 7) and the corresponding grooves (9, 10) it is possible to transmit higher torques while avoiding detrimental cross-sectional weakening of the tool bit shank (8).

8 Claims, 3 Drawing Sheets

TOOL BIT AND TOOL BIT HOLDER FOR HAND HELD TOOLS

BACKGROUND OF THE INVENTION

The present invention is directed to a tool bit holder or chuck for hand-held tools with the tool bit holder having two rotary entrainment or driving grooves open at a free end of the shank with the grooves disposed diametrically opposite one another. The tool bit holder has shaped projecting rotary entrainment means engageable in the rotary entrainment grooves for driving the tool bit shank. Further, the tool bit shank has laterally closed recesses disposed diametrically opposite one another and the tool bit holder contains radially displaceable locking members engageable within the recesses.

A tool bit and tool bit holder of the type described above is disclosed in DE-OS 25 51 125. In this known tool bit holder the rotary entrainment or driving means engageable in the rotary entrainment grooves effect transmission of the torque, while the locking members, radially displaceable within the tool bit holder and engageable into recesses in the tool bit shank, are laterally closed for axial retention of the tool bit. The radial displacability of the locking members is realized by an actuation sleeve which can be turned or displaced axially so that recesses can be brought into alignment with the locking members, whereby the locking members move radially outwardly into the recesses and release the tool bit for removal.

While the axial locking action is not intended to satisfy stringent requirements as far as loading or stress is concerned, considerable forces, due to the torque transmitted, act on the rotary entrainment means of the tool bit holder. As a result, rotary entrainment or driving means of insufficient dimensions are incapable of transmitting torques of a high magnitude, while rotary entrainment means of larger dimensions due to the larger rotary entrainment grooves required, result in a weakening of the tool bit shank with the possibility that fractures may develop in the shank. Up to the present time, an optimum compromise has not been found for symmetrical arrangements where similarly dimensioned rotary entrainment grooves, located diametrically opposite one another, are arranged to receive correspondingly dimensioned rotary entrainment means.

SUMMARY OF THE INVENTION

Therefore, the primary object of the present invention is to provide a tool bit along with a tool bit holder or chuck where sufficiently high torque can be transmitted between the two parts while the tool bit shank is not weakened.

In accordance with the present invention, the rotary entrainment grooves in the tool bit located diametrically opposite one another have different circular arc dimensions.

Accordingly, the different dimensions of the rotary entrainment grooves affords solutions of two different problems.

Initially, it is possible to provide rotary entrainments means of considerably larger dimensions. This feature requires only one of the rotary entrainment grooves to have larger circular arc dimensions, whereby a cross-sectional weakening of the tool bit shank with its inherent disadvantages does not occur. It is possible to develop a new line of hand-held tools capable of imparting greater torque to the tool bits.

Secondly, the tool bits with rotary entrainment grooves dimensioned according to the present invention can be inserted into tool bit holders of conventional tools. When inserting a tool bit embodying the present invention into a tool bit holder or chuck of conventional dimensions widely available in commerce, the torque is transmitted only by the rotary entrainment means which engage into the rotary entrainment groove having the lesser circular arc dimension. Such an arrangement is completely adequate, since such a conventional tool supplies considerably lower torque to the tool bit.

Based on the dimensions involved, particularly for the torque transmission by the rotary entrainment means as well as limiting excessive cross-sectional weakening of the shank, rotary entrainment grooves are advantageous where the larger circular arc dimension is in a range of 1.5 to 2.5 times the dimension of the smaller circular arc. The smaller circular arc dimension corresponds substantially to the dimension of the previously known conventional tool bits, that is, where the dimension of the groove is in the range of appropriately 0.2 to 0.3 times the tool bit shank diameter.

In a preferred embodiment for limiting cross-sectional weakening, the base or bottom of the rotary entrainment groove with the larger circular arc dimension is provided with an arcuate or curved configuration whereby the curved base is located on a radius extending from the axis of rotation of the tool bit. As a result, a rotary entrainment groove of uniform length is formed along part of the circumference of the tool bit shank and the depth of the groove corresponds preferably to the depth of the entrainment groove with the smaller circular arc dimension. With the rotary entrainment grooves shaped in this manner, it is possible to use the tool bit embodying the present invention in conventional tool bit holders or chucks.

If the depth of the rotary entrainment groove with the larger circular arc dimension is made smaller than the depth of the rotary entrainment groove with the smaller circular arc dimension, it is advantageous to provide a further depression or groove section, corresponding to the depth of the groove with the smaller circular arc dimension, and with the same axial length as the grooves. With this arrangement the use of the tool bit embodying the present invention is possible in tool bit holders of conventional tools.

For further adaptation to tool bits holders in conventional tools, preferably the width or circumferential dimension at the bottom of the increased depth groove in the groove with the larger circumferential arc dimension corresponds to the circumferential dimension at the base of the rotary entrainment groove with the smaller circular arc dimension. In addition, the base of increased depth groove section extends chordally and not along a circular arc.

To complete the advantages regarding the transmission of larger torque with a rotary entrainment groove of larger circular arc dimension, the rotary entrainment means in the tool bit holder are preferably designed to correspond to the rotary entrainment grooves having the different circular arc dimensions. This feature assures that tool bits for conventional tool bit holders can not be inserted into tool bit holders shaped according to the present invention. This prevents the possibility of damage through overloading that might be caused to such known tool bits not designed for the transmission of very high torques.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
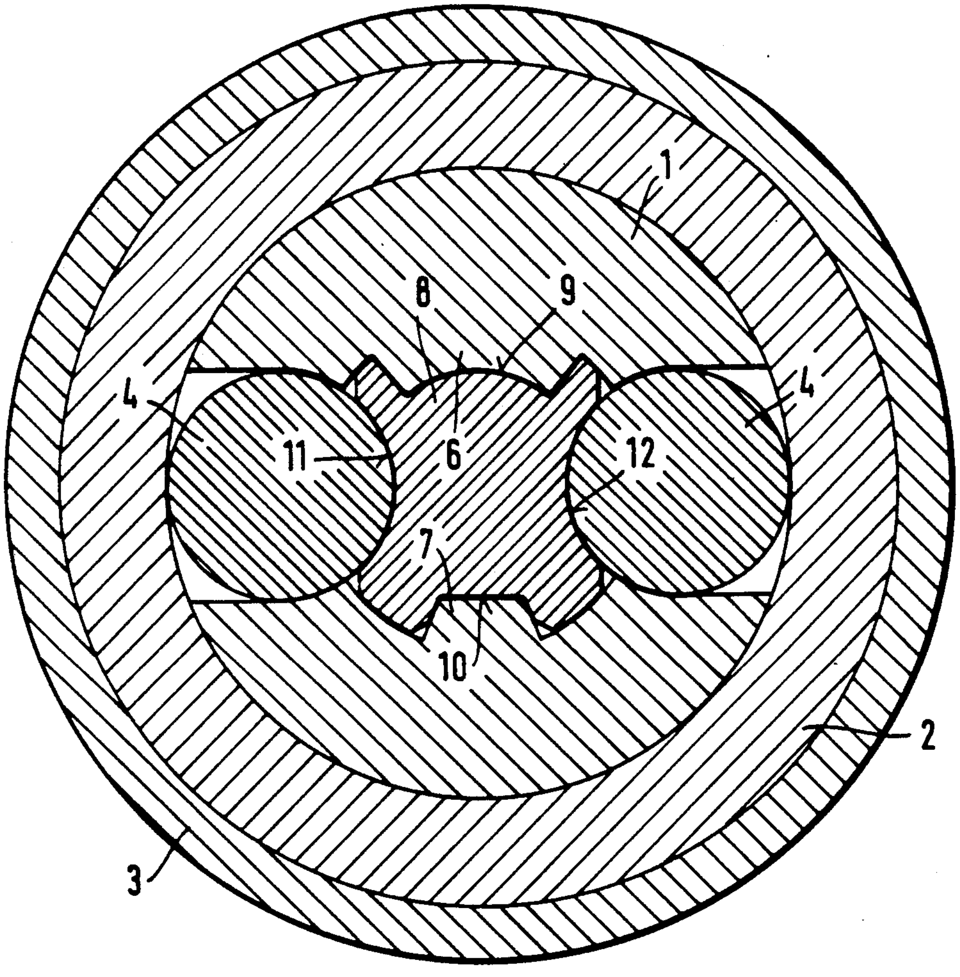
FIG. 1 is a transverse cross-sectional view of a tool bit holder with an inserted tool bit embodying the present invention.

FIG. 1 shows a tool bit holder or chuck illustrated in a simplified manner, with an inner guide 1, an actuation sleeve 2 encircling the guide 1, a cage 3 encircling the sleeve 2, and roller shaped locking members 4. A tool bit with a tool bit shank 8, shown in transverse section, is inserted into the guide 1 of the tool bit holder.

Guide 1 has rotary entrainment means or members 6, 7 in its radially inner surface for transmitting torque from the tool bit holder to the shank 8 of the tool bit. The rotary entrainment members 6, 7 each have a different circular arc dimension, that is, in the circumferential direction, engaged in rotary entrainment grooves 9, 10 in the outer surface of the tool bit shank 8. The radially displaceable locking members 4 effect axial retention of the tool bit in the holder and in the engaged position the locking members 4 seat in recesses 11, 12 in the tool bit shank 8. The recesses 12 are closed laterally along their sides and ends.

For radially outward displacement of the locking members 4, the actuation sleeve 2 is offset from the position shown in FIG. 1, that is, it is either turned around the axis of the tool bit shank or it is displaced axially, so that displacement chambers are aligned with the locking members 4, these chambers are not shown for reasons of clarity, whereby the locking members can move radially out of the recesses 11, 12, releasing the tool bit shank 8 so that the tool bit can be removed from the tool bit holder.

Figure 2:
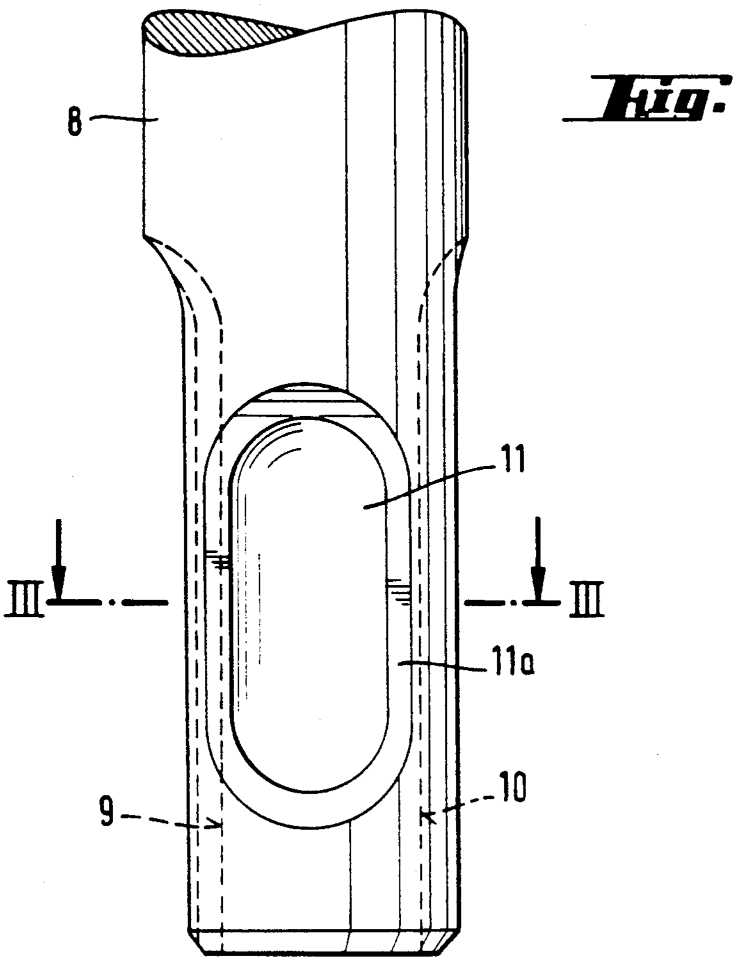
FIG. 2 is a partial elevational view of the tool bit shown in FIG. 1 illustrating the tool bit shank.
Figure 3:
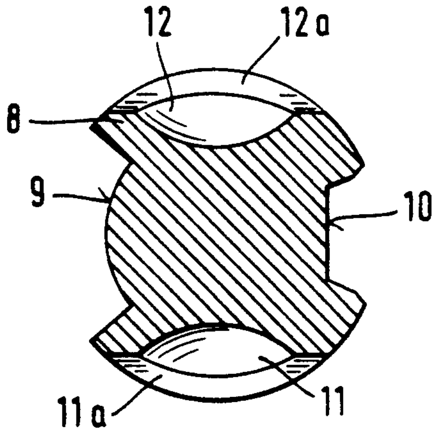
FIG. 3 is a transverse sectional view through the tool bit shank in FIG. 2 taken along the line III—III.

In FIGS. 2 and 3 the tool bit illustrated in FIG. 1 is shown with the tool bit shank 8 having the rotary entrainment grooves 9, 10 and the laterally closed recesses 11, 12. The grooves 9, 10 shown in dashed lines extend to the free or lower end of the shank in FIG. 2 so that the grooves are open at the free end. As can be noted more clearly in FIG. 3, the rotary entrainment groove 9 has a larger circular arc dimension as compared to the rotary entrainment groove 10. The circular arc dimension refers to the dimension in the circumferential direction around the axis of the tool bit shank 8. Moreover, in FIG. 2 it can be noted that the recesses 11, 12 each have a lead-in chamfer 11*a*, 12*a* for facilitating entry of the locking members 4 into the recesses 11, 12.

In FIG. 3 it can be seen that the base of the rotary entrainment groove 9 extends along a circular arc while the base of the rotary entrainment groove 10 extends chordally.

Figure 4:
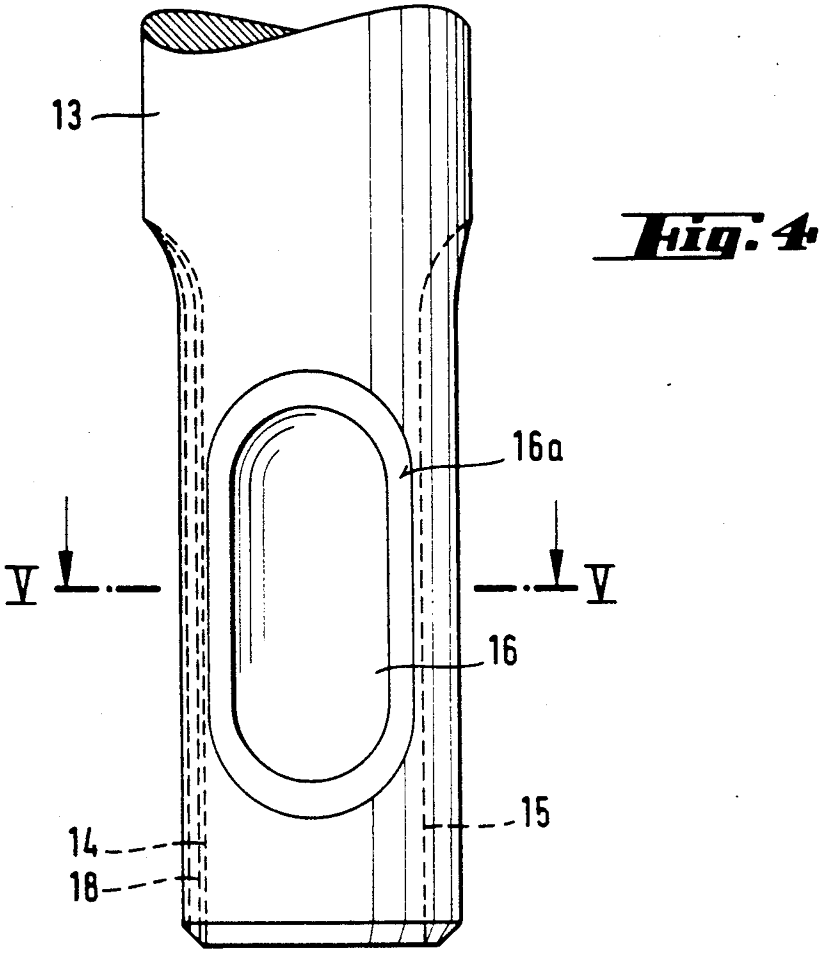
FIG. 4 is an elevational view, similar to FIG. 2, illustrating a tool bit shank of another tool bit.
Figure 5:
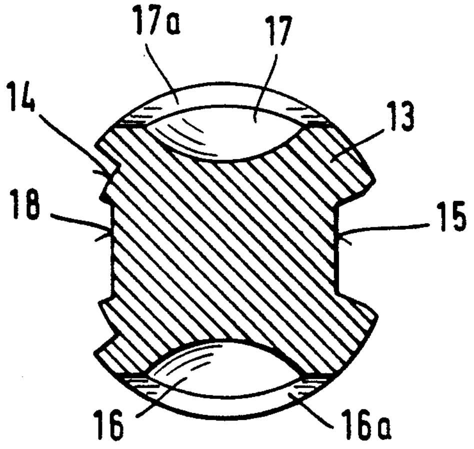
FIG. 5 is a transverse sectional view through the tool bit shank in FIG. 4 taken along the line V—V.

Another tool bit shank 13 is displayed in FIGS. 4 and 5. The tool bit shank 13 of this alternate embodiment tool bit has rotary entrainment grooves 14, 15 and axial retention recesses 16, 17 closed along their sides and ends. Rotary entrainment groove 14 has a larger circular arc dimension and, in addition, has a symmetrically located increased depth groove section 18. While the base of the rotary entrainment groove 14 located outwardly from the groove section 18 extends along a circular arc, the base of the groove section extends chordally, generally parallel to the base of the rotary entrainment groove 15. Further, the dimension in the circumferential direction of the base of the groove section 18 corresponds to the dimension in the circumferential direction of the base of the rotary entrainment groove 15. The recesses 16, 17 each have a lead-in chamfer 16*a*, 17*a* for the purpose as explained above.

While specific embodiments of the invention have been shown and described in detail to illustrate the application of the inventive principles, it will be understood that the invention may be embodied otherwise without departing from such principles.

I claim:

1. Tool bit and tool bit holder or chuck for a hand-held tool, the tool bit having an axially extending shank with a free end and an axially and circumferentially extending outside surface, said tool bit shank (8, 13) comprises two axially extending rotary entrainment grooves (9, 10; 14, 15) located diametrically opposite one another and extending radially inwardly from the outside surface and being open at the free end of the shank, said tool bit holder has shaped rotary entrainment means (6, 7) engageable in said rotary entrainment grooves (9, 10; 14, 15), said tool bit shank (8, 13) has two diametrically opposite recesses (11, 12; 16, 17) therein extending radially inwardly from the outside surface and spaced circumferentially from said rotary entrainment grooves, and recesses (11, 12; 16, 17) having closed sides and ends and spaced from the free ends of said shank, and radially displaceable locking members (4, 4) located in said tool bit holder and engageable in said recesses (11, 12; 16, 17), wherein the improvement comprises that said rotary entrainment grooves (9, 10; 14, 15) extend over different circumferential arcs in the outside surface in the direction extending circumferentially about the tool bit shank axis.

2. Tool bit and tool bit holder, as set forth in claim 1, wherein one of said rotary entrainment grooves (9; 14) has a larger circular arc dimension in the range of 1.5 to 2.5 times a smaller circular arc dimension of the other rotary entrainment groove (10; 15).

3. Tool bit and tool bit holder or chuck for a hand-held tool, the tool bit having an axially extending shank with a free end, said tool bit shank (8, 13) comprises two axially extending rotary entrainment grooves (9, 10; 14, 15) located diametrically opposite one another and being open at the free end of the shank, said tool bit holder has shaped rotary entrainment means (6, 7) engageable in said rotary entrainment grooves (9, 10; 14, 15), said tool bit shank (8, 13) has two diametrically opposite recesses (11, 12; 16, 17) therein spaced circumferentially from said rotary entrainment grooves, and said recesses (11, 12; 16, 17) having closed sides and ends and spaced from the free end of said shank, and radially displaceable locking members (4, 4) located in said tool bit holder and engageable in said recesses (11, 12; 16, 17), wherein the improvement comprises that said rotary entrainment grooves (9, 10; 14, 15) extend over different circumferential arcs in the direction extending circumferentially about the tool bit shank axis, one of said rotary entrainment grooves (9; 14) has a larger circular arc dimension in the range of 1.5 to 2.5 times a smaller circular arc dimension of the other rotary entrainment groove (10; 15), the rotary entrainment groove (9; 14) with the larger circular arc dimension having a base extending at least partly along a circular arc having a radius extending from the axis of the tool bit shank.

4. Tool bit and tool bit holder, as set forth in claim 3, wherein the rotary entrainment groove (14) with the larger circular arc dimension has a symmetrically arranged groove section (18) extending radially inwardly to a base from the base of such rotary entrainment groove (14).

5. Tool bit and tool bit holder, as set forth in claim 4, wherein the dimension in the circumferential direction of the base of groove section 18 corresponds to the dimension in the circumferential direction at the base of the other rotary entrainment groove (15) having the smaller circular arc dimension.

6. Tool bit and tool bit holder, as set forth in claim 5, wherein the base of the groove section (18) extends chordally relative to the axis of the tool bit shank and substantially parallel to the base of the other rotary entrainment groove (15).

7. Tool bit and tool bit holder, as set forth in claim 1, wherein the rotary entrainment means (6, 7) engageable in said rotary entrainment groove (9, 10; 14, 15) have circular arc dimensions corresponding to the different circular arc dimensions of the rotary entrainment grooves (9, 10; 14, 15).

8. Tool bit and tool bit holder, as set forth in claim 1, wherein said rotary entrainment grooves are located symmetrically in the circumferential direction relative to a a diameter of said tool bit shank.

* * * * *